United States Patent
Wei

(10) Patent No.: US 9,563,258 B2
(45) Date of Patent: Feb. 7, 2017

(54) SWITCHING METHOD AND ELECTRONIC DEVICE

(71) Applicant: Lenovo (Beijing) Co., Ltd., Beijing (CN)

(72) Inventor: Zhiyu Wei, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 46 days.

(21) Appl. No.: 14/583,610

(22) Filed: Dec. 27, 2014

(65) Prior Publication Data

US 2016/0091956 A1     Mar. 31, 2016

(30) Foreign Application Priority Data

Sep. 26, 2014    (CN) .......................... 2014 1 0504410

(51) Int. Cl.
| | |
|---|---|
| *G06F 1/32* | (2006.01) |
| *G06F 1/16* | (2006.01) |
| *G06F 3/01* | (2006.01) |
| *G09G 5/00* | (2006.01) |

(52) U.S. Cl.
CPC ............ *G06F 1/3265* (2013.01); *G06F 1/163* (2013.01); *G06F 3/017* (2013.01); *G09G 5/00* (2013.01); *G09G 2330/022* (2013.01)

(58) Field of Classification Search
CPC ...... G06F 1/3265; G06F 1/163; G06F 3/0346; G06F 3/0416; G06F 3/04847; G09G 5/30; G09G 2320/06; G09G 2320/0626
USPC ........................................................ 345/212
See application file for complete search history.

(56) References Cited

U.S. PATENT DOCUMENTS

| | | | | |
|---|---|---|---|---|
| 8,743,161 | B2* | 6/2014 | Pantfoerder | G09G 3/20 345/207 |
| 8,994,827 | B2* | 3/2015 | Mistry | H04N 5/2252 348/158 |
| 9,026,927 | B2* | 5/2015 | Brumback | A61B 5/0015 715/764 |
| 9,298,301 | B2* | 3/2016 | Tsai | G06F 3/0412 |

(Continued)

OTHER PUBLICATIONS

Office Action dated Feb. 10, 2016 out of corresponding German Patent Application No. 102014019600.3 (7 pages including English translation).

(Continued)

*Primary Examiner* — Tom Sheng
(74) *Attorney, Agent, or Firm* — Brinks Gilson & Lione; G. Peter Nichols

(57) ABSTRACT

A switching method and an electronic device solve the technical problem of an inflexible switching way of an electronic device. The method includes capturing a first sensing parameter by a first sensing unit, and capturing a second sensing parameter by a second sensing unit, when the electronic device is in a first work state; judging whether the first sensing parameter meets a first preset condition and the second sensing parameter meets a second preset condition, or not; generating a first switching instruction for controlling the electronic device to switch from the first work state to a second work state, when the first sensing parameter meets the first preset condition and the second sensing parameter meets the second preset condition; and controlling the electronic device to switch from the first work state to the second work state, according to the first switching instruction.

14 Claims, 3 Drawing Sheets

(56) References Cited

U.S. PATENT DOCUMENTS

| | | | |
|---|---|---|---|
| 2008/0006762 A1* | 1/2008 | Fadell | G01J 1/4204 |
| | | | 250/201.1 |
| 2008/0165161 A1* | 7/2008 | Platzer | G06F 1/1616 |
| | | | 345/177 |
| 2012/0169608 A1* | 7/2012 | Forutanpour | G09G 3/342 |
| | | | 345/173 |
| 2014/0124647 A1 | 5/2014 | Hsu | |
| 2014/0125618 A1 | 5/2014 | Panther | |
| 2014/0278216 A1 | 9/2014 | Chen | |
| 2015/0022438 A1* | 1/2015 | Hong | H04M 1/7253 |
| | | | 345/156 |
| 2015/0092520 A1* | 4/2015 | Robison | G04G 21/02 |
| | | | 368/9 |
| 2015/0185837 A1* | 7/2015 | Whitney | G06F 3/014 |
| | | | 345/156 |
| 2015/0358438 A1* | 12/2015 | Kim | G04G 21/025 |
| | | | 455/566 |

OTHER PUBLICATIONS

Office Action dated Jun. 21, 2016 out of corresponding German Patent Application No. 10 2014 019 600.3 (9 pages including English translation).

* cited by examiner

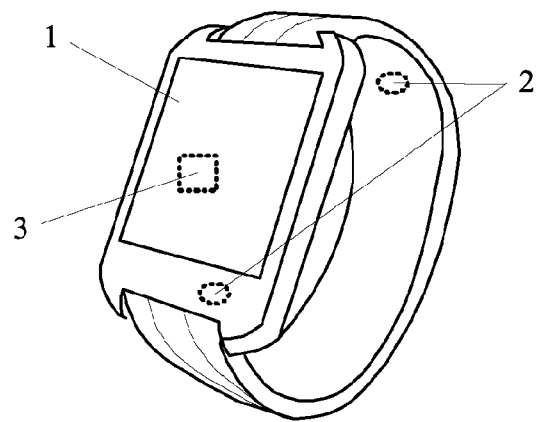
FIG. 4
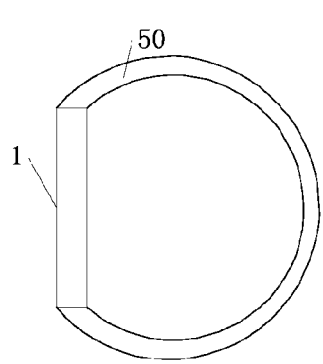 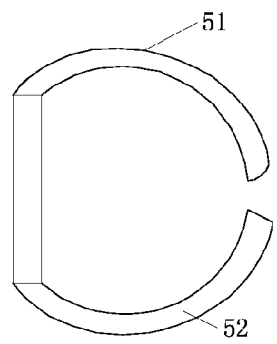
FIG. 5A  FIG. 5B
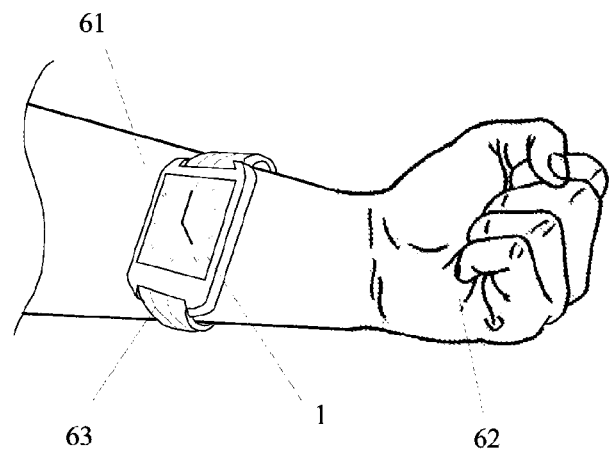
FIG. 6

SWITCHING METHOD AND ELECTRONIC DEVICE

This application claims priority to Chinese patent application No. CN 201410504410.X filed on Sep. 26, 2014, the entire contents of which are incorporated herein by reference.

The present disclosure relates to the field of electronic technology, and more particularly, to a switching method and an electronic device.

BACKGROUND

With the rapid development of the technology and the increasingly fierce market competition, the performance of the electronic device has been improved greatly. The user may carry out increasingly more tasks with the electronic device which has been an indispensable part of human life and study. For example, the user may communicate through a smart watch having a communication function, and so on.

Currently, an important index of the electronic device is a power consumption and a corresponding standby time of the device. Therefore, in order to decrease the power consumption, the electronic device is in a standby work state with its screen off in most times, so as to prolong the standby time of the electronic device. The electronic device is woken up by a control operation so as to turn on the screen for use, only when the user needs to use the electronic device.

However, when the user needs to use the electronic device, he needs to control the device to enter a screen-on state by a certain operation on a specific key, so as to view a display interface through a corresponding display screen. For example, when the smart watch is in a standby state with its screen off, the user needs to trigger a specific key, for example a power key, to turn on the screen so as to check the time, and so on. However, when it is not convenient for the user to perform the operation in some times, it may result in that the user cannot check the time in time, or needs to free one hand dedicatedly to perform the operation, otherwise the electronic device will not be switched between the work states.

Therefore, the electronic device in the related art needs a flexible switching way.

SUMMARY

A switching method and an electronic device are provided in the embodiments of the present disclosure, solving the technical problem of poor flexibility of the switching way of the electronic device, and realizing a technical effect of a flexible switching way of the electronic device.

In one aspect, a switching method is provided in the present disclosure, which is applied to an electronic device comprising a display unit and at least two sensing units, the method comprising: capturing a first sensing parameter by a first sensing unit of the at least two sensing units, and capturing a second sensing parameter by a second sensing unit of the at least two sensing units, when the electronic device is in a first work state in which the display unit is in a state with a first power consumption; at least judging whether the first sensing parameter meets a first preset condition and the second sensing parameter meets a second preset condition, or not; the electronic device being capable of generating a first switching instruction for controlling the electronic device to switch from the first work state to a second work state in which the display unit is in a state with a second power consumption larger than the first power consumption, when a judging result indicates that the first sensing parameter meets the first preset condition and the second sensing parameter meets the second preset condition; and controlling the electronic device to switch from the first work state to the second work state, according to the first switching instruction.

In another aspect, a switching method is provided in the present disclosure, which is applied to an electronic device comprising a display unit and a second sensing unit, the electronic device being fixed to a first part of an operating body through a fixing body, the method comprising: at least judging whether an operation magnitude parameter corresponding to a second operation meets a second preset condition, or not, when the electronic device is in a first work state in which the display unit is in a state with a first power consumption, and it is detected that the second part of the operating body is performing the second operation; the electronic device being capable of generating a first switching instruction for controlling the electronic device to switch from the first work state to a second work state in which the display unit is in a state with a second power consumption larger than the first power consumption, when it meets the second preset condition; and controlling the electronic device to switch from the first work state to the second work state, according to the first switching instruction.

In a further aspect, an electronic device is provided in the present disclosure, comprising: a display for outputting image information when the electronic device is in a second work state in which the display is in a state with a second power consumption larger than a first power consumption; at least two sensors, a first sensor of which being capable of sensing a first sensing parameter and a second sensor of which being capable of sensing a second sensing parameter when the electronic device is in a first work state in which the display is in a state with the first power consumption; and a processor being capable of generating a first switching instruction when it is at least determined that the first sensing parameter meets a first preset condition and the second sensing parameter meets a second preset condition; and controlling the electronic device to switch from the first work state to the second work state according to the first switching instruction.

BRIEF DESCRIPTION OF THE DRAWINGS

FIG. 4 is a schematic diagram of a main structure of an electronic device in a third embodiment of the present disclosure;

FIG. 5A and FIG. 5B are schematic diagrams of two structures of a fixing body in an embodiment of the present disclosure, respectively; and FIG. 6 is a schematic diagram of the electronic device being fixed to the operating body in the third embodiment of the present disclosure.

DETAILED DESCRIPTION

Figure 1:
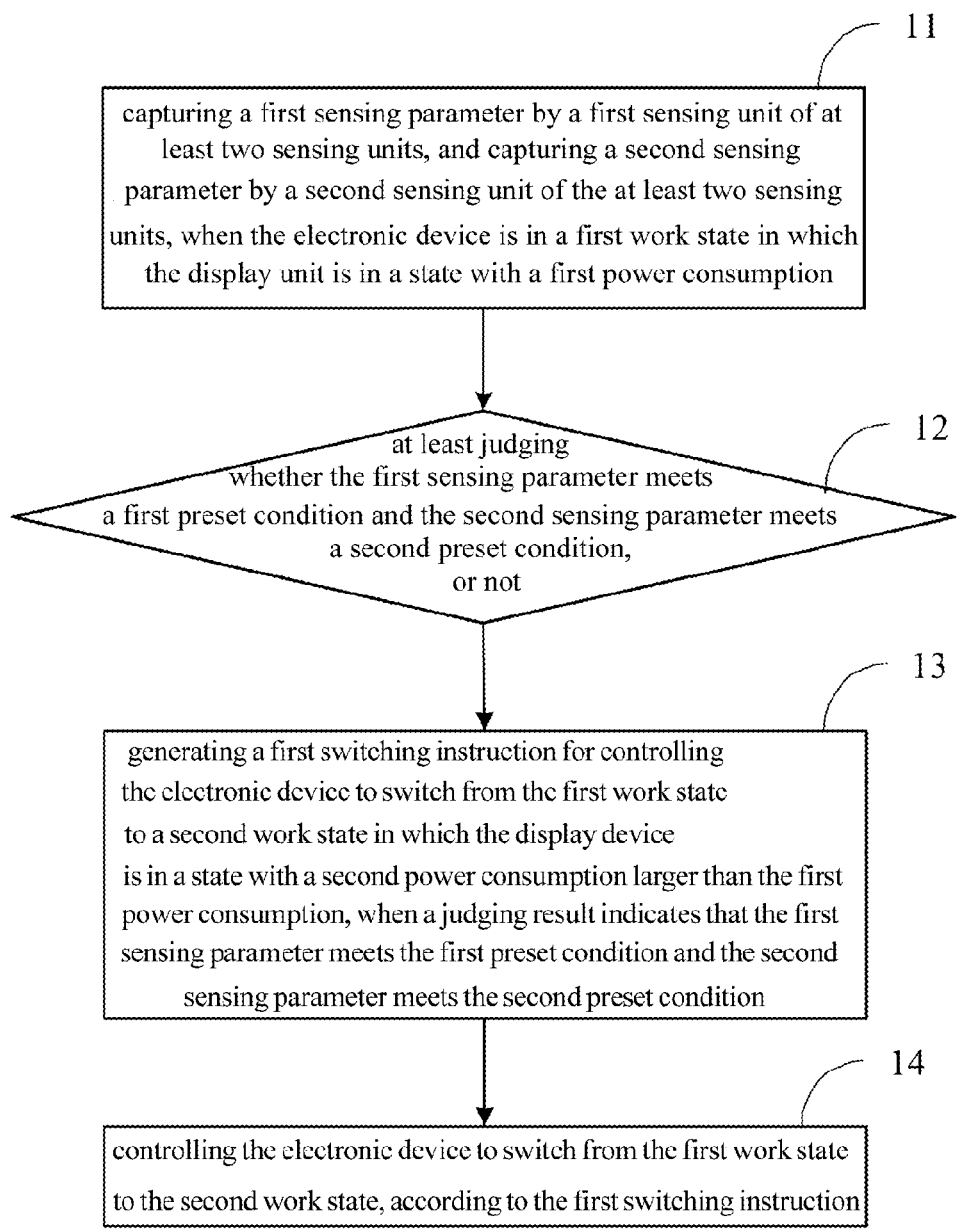
FIG. 1 is a main flowchart of a switching method in a first embodiment of the present disclosure.

A switching method is provided in an embodiment of the present disclosure, which is applied to an electronic device comprising a display unit and at least two sensing units, the method comprising: capturing a first sensing parameter by a first sensing unit of the at least two sensing units, and capturing a second sensing parameter by a second sensing unit of the at least two sensing units, when the electronic device is in a first work state in which the display unit is in a state with a first power consumption; at least judging whether the first sensing parameter meets a first preset condition and the second sensing parameter meets a second preset condition, or not; the electronic device being capable of generating a first switching instruction for controlling the electronic device to switch from the first work state to a second work state in which the display unit is in a state with a second power consumption larger than the first power consumption, when a judging result indicates that the first sensing parameter meets the first preset condition and the second sensing parameter meets the second preset condition; and controlling the electronic device to switch from the first work state to the second work state, according to the first switching instruction.

In the embodiments of the present disclosure, when the electronic device is in the first work state with a low power consumption, since the first sensing parameter and the second sensing parameter can be acquired by at least two sensing units, on the premise that it is determined that at least the first sensing parameter and the second sensing parameter meet the first preset condition and the second preset condition respectively, the first switching instruction is generated to control the electronic device to switch from the first work state to the second work state with a high power consumption. Therefore, the electronic device is controlled to switch the work state by the first switch instruction generated when it is detected that at least two sensing parameter meet the preset conditions. For example, the first sensing parameter and the second sensing parameter corresponding to a hand wearing the watch may be captured by at least two sensing units. If both meet the preset conditions, for example, if it is determined by the sensing parameter that a predetermined operation such as a hand raising up and a first are performed at the same time at the hand or the finger, it is determined that they meet the first preset condition and the second preset condition. Then, the work state can be switched without a specific key operation on the electronic device per se, so that the flexibility of the work state switching of the electronic device is improved.

Also, since it requires at least the first sensing parameter and the second sensing parameter meeting the first preset condition and the second preset condition respectively when determining whether the first switching instruction is generated or not, or even more judgment conditions, the accurateness of determining the generation of the first switching instruction of the electronic device is relatively high by the judgment of multiple sensing parameters, and thus avoiding an error response of the electronic device.

In order to make the object, the technical solution and the advantage of the embodiments of the present disclosure more clear, the technical solution in the embodiments of the present disclosure will be described clearly and thoroughly with reference to the accompany drawings of the embodiments of the present disclosure in the following. Obviously, the described embodiments are only a part of, but not all, the embodiments of the present disclosure. All the other embodiments obtained by those of ordinary skill in the art without any inventive labor on the basis of the embodiments of the present disclosure shall fall within the protection scope of the present disclosure.

In the embodiments of the present disclosure, the electronic device may be various electronic devices, such as a notebook computer, a PAD, a mobile phone, a wearable device and so on, which is not limited in the present disclosure.

In addition, in the description, the term "and/or" only describes a relationship between objects, and means that three kinds of relationship may exist. For example, A and/or B may indicate three cases in which A exists alone, A and B exist at the same time, or B exists alone. Also, in the description, the character "/" generally represents that the objects before and after are with a relationship of "or".

Hereinafter, the implementations of the present disclosure will be described in detail with reference to the accompany drawings.

First Embodiment

Referring to FIG. 1, a switching method applied to an electronic device is provided in an embodiment of the present disclosure, the electronic device comprising a display unit and at least two sensing units. The method may comprise the following steps.

At a step 11, a first sensing parameter is captured by a first sensing unit of the at least two sensing units, and a second sensing parameter is captured by a second sensing unit of the at least two sensing units, when the electronic device is in a first work state in which the display unit is in a state with a first power consumption.

First, in the first work state, the display unit of the electronic device may be in a screen-off state. That is, the electronic device may be in a standby state with a low power consumption at this time. Then, parameter information related to the electronic device may be captured in real time by the at least two sensing units. Alternatively, the parameter of the electronic device itself and related parameters may be captured in a preset time interval, such as 5 s or 15 s and so on. The at least two sensing units may be sensing units of the same type or different types, which is not limited herein in the present disclosure.

Particularly, the first sensing parameter is captured by the first sensing unit of the at least two sensing units, and the second sensing parameter is captured by the second sensing unit of the at least two sensing units. The first sensing unit and the second sensing unit may be sensing units independently from each other.

In the embodiment of the present disclosure, the first sensing parameter may be a device parameter corresponding to the electronic device, captured by the first sensing unit, and the device parameter can indicate a first operation performed by a first part of an operating body corresponding to the electronic device; and the second sensing parameter is a parameter corresponding to a second part of the operating body, which is captured by the second sensing unit.

Figure 2:
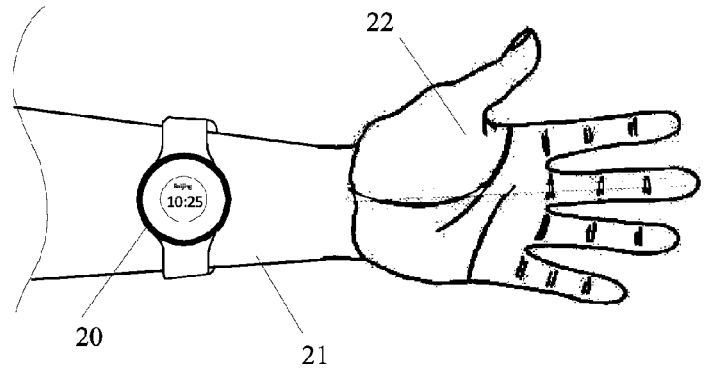
FIG. 2 is a schematic diagram of an electronic device and an operating body in the first embodiment of the present disclosure.

It is noted that the electronic device is fixed to the operating body which may be the hand or the head of the user, through a fixing member. For example, when the electronic device is fixed to the hand of the user, the first part of the operating body may be a part of the arm and the wrist wearing the watch, and the second part of the operating body may be the palm and all the fingers of the user. Generally, the electronic device may be fixed firmly at the first part through a fixing member such as a wrist belt, and maintain a relative stable state with the operating body. Referring to FIG. 2, the numeral 20 indicates the electronic device, the numeral 21 indicates the first part of the operating body and the numeral 22 indicates the second part of the operating body. Herein, FIG. 2 shows an example in which the display unit of the electronic device is at the same side with the center of the user's palm. There may be other wearing ways in addition to that shown in FIG. 2. For example, the display unit of the electronic device is at the same side of the back of the user's hand, so as to adapt to the user's use habit, and to check the time and the prompt information conveniently. It is noted that the accompany drawings involved in the embodiment of the present disclosure are only for the convenience of explanation and description of the corresponding examples.

In the embodiment of the present disclosure, the first sensing unit and the second sensing unit may be sensors such as a gravity sensor, an infrared sensor, a capacity sensor or an electrode sensor and so on.

Particularly, when the first sensing unit captures the first sensing parameter, the device parameter related to the electronic device may be captured at the first part directly, so as to determine the first operation performed by the first part through the analysis of the device parameter. The first sensing parameter may be a spatial location parameter or a pressure parameter or the like of the electronic device captured at the first part. For example, when the captured gravity parameter of the electronic device increases largely, if the gravity parameter value reaches to the parameter value corresponding to a hand raising operation pre-stored in the electronic device, it may be derived that the user performs a first operation of raising the hand up.

In addition, since the second sensing parameter is the parameter corresponding to the second part of the operating body captured by the second sensing unit, when the second sensing parameter corresponding to the second part is captured by the second sensing unit, the electronic device may be still at the first part of the operating body. For example, when the watch is worn at the wrist of the user, the electrical signal parameter generated by the muscle when the user's finger is in movement may be captured by the electrode in the watch, and the electrical signal parameter may be the second sensing parameter. Alternatively, if the second sensor is the infrared sensor, the change parameter related to the user's finger, for example, whether the finger is bended, the magnitude parameter of the bending and so on, may be captured directly, and be treated as the second sensing parameter.

Further, after the second sensing parameter is captured, the second operation corresponding to the second part may be derived, which will be described in detail in the following embodiments.

In the embodiment of the present disclosure, when the electronic device is fixed to the first part of the operating body by the fixing body, the second operation performed by the second part of the operating body may be determined according to the biometric feature parameter of the first part captured by the second sensing unit, wherein the biometric feature parameter may be the captured parameter related to the human body, for example, the electrical signal parameter generated when the muscle is in movement.

Since a corresponding electrical signal will be generated during the muscle movement and different operations will cause different muscles to generate different electrical signals, the electrical signal parameter related to the second part may be captured by the electrode of the second sensing unit when a certain operation is performed by the second part.

In addition, multiple electrical signal samples may be stored in the electronic device in advance, which may be the electrical signal parameters generated by related muscles when the user performs different operations. For example, when the user bends his finger and renders a holding state, the captured electrical signal may be the first electrical signal sample. When the user continues to bend his finger and renders a first state, the captured electrical signal may be the second electrical signal sample, and so on. Thus, when the electrical signal parameter is obtained, it is matched with the electrical signal sample and a corresponding operation may be determined.

Therefore, the process of capturing the biometric feature parameter at the first part and determining the second operation may be as follows. When the electronic device is worn at the user's arm, the biometric electrical signal generated during the arm muscle movement may be detected by the electrode sensor equipped within the electronic device. The captured electrical signal is matched with the pre-stored electrical signal sample, and the corresponding second operation may be determined according to the match result, in order for the electronic device to respond to the second operation or generate a corresponding operation instruction.

In this step, since the corresponding operation is determined by the biometric feature parameter related to the operating body directly, and the process of capturing the biometric feature parameter is generally sensitive, the accuracy of the biometric electrical signal is relatively high, and it is more accurate than the way of determining the operation of the operating body by capturing the device parameter. For example, when the user is raising his hand or taking an elevator, the gravity parameter of the electronic device will increase. If the parameter of the electronic device is captured directly, it is impossible to recognize whether the user performs the preset operation or not. By acquiring the user's biometric feature parameter (i.e., the biometric electrical signal), it may be determined that whether the change is due to the user's hand raising operation or not. If it is, a response is made; otherwise it remains the original state, so that the electronic device has a certain recognition function. The error response of the electronic device is decreased while the accuracy of the electronic device is improved.

In addition, in the embodiment of the present disclosure, since the operation performed by the second part may be determined by detecting the biometric feature parameter corresponding to the first part, that is, since the operation performed by a corresponding part of the operating body may be determined by the relationship between the muscles during movement and the corresponding biometric electrical signal, the user neither needs to move the electronic device to sense the part performing the operation when the user performs various operations, nor needs to arrange a sensing unit at each operation part, so that the acquisition process is quicker and not too many sensing devices are necessary, which is good to the electronic device's shape. For example, if the operation performed by the user's finger is to be detected, it may be determined that the finger performs an operation by capturing the electrical signal change of the muscle at the part where the watch is located no matter the watch is worn at the upper part of the arm or the lower part of the arm. Alternatively, the action performed by the shoulder of the user may be detected as well when the watch is at the lower part of the arm, and it does not need to change or adjust the shape of the electronic device due to the detection of the different parts.

In addition, when the operating body is the user's head, the electronic device may be a head mounted device, for example a head mounted display. The first sensing parameter and the second sensing parameter captured by the at least two capturing units may be for example the head movement and in-brain signal when the user's head is performing a corresponding operation. For example, the nod and shake actions are captured by the electrode sensor built in the head mounted device, or the brain electrical wave signal generated by the brain is captured by the electrode in contact with the head skin, for example the forehead skin or the temple skin, or b the eyeball movement parameter is captured by the image capturing sensor towards the eye. The process of determining the corresponding operation according to the capturing parameter may be the same as the process of determining the second operation as described above, and will not be described here to avoid redundancy.

At a step 12, it is at least judged whether the first sensing parameter meets a first preset condition and the second sensing parameter meets a second preset condition, or not.

In the embodiment of the present disclosure, after obtaining the at least two sensing parameters by the at least two sensing units, firstly, it may be judged whether the first sensing parameter meets a first preset condition and the second sensing parameter meets a second preset condition, or not. The detailed judgment process may comprise the following processes.

In a first process, it is judged whether a parameter value corresponding to the first sensing parameter is larger than a preset threshold which is a change value corresponding to a change in a spatial location occurred in the electronic device, or not. If it is, it indicates that the first sensing parameter meets the first preset condition.

Generally, when the electronic device is fixed to the operating body, if the user performs a certain operation with large movement, the spatial location of the electronic device will change. For example, if the user swings the arm, the parameter value corresponding to the captured first sensing parameter can indicate that the electronic device has been changed in movement, which may include the change in the movement direction, the change in the movement magnitude or the change in the rotation angle. Therefore, the preset threshold may be set according to the spatial movement range of the electronic device, for example, the movement magnitude of the electronic device or the movement rotation angle and so on.

If it is, it indicates that the first sensing parameter meets the first preset condition. For example, if the user rotates the watch and the angle change parameter value corresponding to the captured first sensing parameter is 60°. If the preset angle threshold is 50°, it indicates that the first sensing parameter meets the first preset condition.

In a second process, it is judged whether the second sensing parameter matches with a preset parameter which is an operation parameter of a second part of an operating body performing an operation including a preset action when the electronic device is fixed to a first part of the operating body through a fixing body, or not. If it is, it is determined that the second sensing parameter meets the second preset condition.

The preset parameter may be a biometric electrical signal generated by the arm muscle of the user when the user performs an operation comprising a preset action. Since the involved muscle and the generated biometric electrical signals are different when different operations are performed by different parts, it may be determined whether an operation comprising a preset action, such as a fist, is performed at the second part of the user or not by matching the second sensing parameter with the preset parameter, and it may be further determined whether it meets the second present condition or not.

Further, at the same time when it is at least judged whether the first sensing parameter meets a first preset condition and the second sensing parameter meets a second preset condition or not, the embodiment of the present disclosure may further comprise the following processes.

In a third process, a first capturing timing corresponding to the first sensing parameter and a second capturing timing corresponding to the second sensing parameter are determined, and it is judged whether a time difference between the first capturing timing and the second capturing timing meets a third preset condition or not.

That is, at the same time when it is judged that the acquired first sensing parameter meets a first preset condition and the second sensing parameter meets a second preset condition, it requires some other condition judgment, which is the capturing timing as an example herein. The third condition may be a preset time difference range, for example 0-5 second. Then, the timings for capturing the first sensing parameter and the second sensing parameter may be the same timing. For example, if the user makes a first in the process of swinging his arm, the change in the spatial location of the electronic device and the operation of the user's arm are captured by at least two sensing units at the same time.

Alternatively, the user may perform the swing operation first. For example, the first sensing parameter is captured at the first capturing timing. Then, after 2 s, the user makes a fist, then the time difference between the second capturing timing for capturing the second sensing parameter and the first capturing timing is 2 s, which is in the present time difference range, thereby it is determined that the third preset condition is met.

At a step 13, the electronic device is capable of generating the first switching instruction for controlling the electronic device to switch from the first work state to the second work state when a judging result indicates that the first sensing parameter meets the first preset condition and the second sensing parameter meets the second preset condition, wherein the display unit is in a state with a second power consumption larger than the first power consumption, in the second work state.

In the embodiment of the present disclosure, the second work state of the electronic device may be a normal work state in which the display unit is in a screen-on state. The power consumption in this state is larger than that in the standby state. The user may use corresponding functions of the electronic device, for example, checking the time, checking the prompt information, and so on.

When the electronic device is switched from the first work state to the second work state, the display brightness of the display unit changes correspondingly.

For example, the display brightness of the display unit is a first brightness in the first work state, for example 20%. When the electronic device is switched to the second work state, the display brightness of the display unit may be switched from the first brightness to the second brightness, for example 60%. Therefore, the display brightness may be controlled to be switched in synchronize with the switch of the work state, so as to improve the display brightness of the display unit.

The first brightness and the second brightness may be set up in factory, or may be set up by the user according to use habit. For example, if the first brightness is set at 0% and the second brightness is set at a display brightness larger than 0%, for example 50%, the switch process of the display unit is a process from the screen-off state to the screen-on state, in the process of the switch from the first work state to the second work state of the electronic device.

Particularly, in the practical performing process, if the above three judgment processes are performed, the step 13 may comprise controlling the electronic device to generate the first switching instruction so as to switch the work state of the electronic device, if the judging result indicates that the first sensing parameter meets the first preset condition and the second sensing parameter meets the second preset condition, and the time difference meets the third preset condition.

Therefore, in the particular performing process, during the judgment by the sensing parameters captured by the at least two sensing units, the first switching instruction is determined according to the result of the third judgment of the capturing timing at the same when the two preset conditions are met. Therefore, when assuring the first sensing parameter and the second sensing parameter meet the corresponding preset conditions, the operation corresponding to the sensing parameters have some correlation by judging the time difference between the capturing timings. That is, the first switching instruction for controlling the electronic device to switch the work state can only be generated when a continuous operation is formed in a predetermined time difference; thereby the accuracy of generating the instruction is improved.

At a step 14, the electronic device is controlled to switch from the first work state to the second work state, according to the first switching instruction.

In the embodiment of the present disclosure, when controlling the electronic device to switch from the first work state to the second work state and the display unit, and in turn, switching the display unit from the screen-off state to the screen-on state, the electronic device may start a specific application, and an application picture corresponding to the specific application may be displayed in the display region corresponding to the display unit. For example, the specific application may be a clock application. After switching to the second work state, the user may know the current time, for example, Beijing time 04:53 p.m., by the display unit.

Alternatively, in the embodiment of the present disclosure, at the same time when controlling the electronic device to switch from the first work state to the second work state, according to the first switching instruction, the method may further comprise determining a first display brightness corresponding to the display unit according to the second sensing parameter; and controlling the display unit to display the corresponding application picture with the first display brightness.

Particularly, the step of determining the first display brightness corresponding to the display unit according to the second sensing parameter may comprise: determining a first operation times of a second operation corresponding to the second sensing parameter performed by a second part of the operating body; and determining a display brightness corresponding to the first operation times as the first display brightness according to a relationship between an operation times and a display brightness.

That is, when controlling the electronic device to switch to the second work state according to the first switching instruction, the display unit enters the screen-on state from the screen-off state. At this time, the brightness or darkness of the display brightness or the like of the display unit may be determined according to the second sensing parameter.

The process of determining the first display brightness may be as follows. A first operation times of a second operation performed by a second part of the operating body is determined according to the second sensing parameter. The first operation times may be the operation times within a preset time. For example, if a first operation is made by the second part in the process of swinging by the arm of the user, the determined first operation times may be the times of making first during the time period of swinging arm, so as to determine the corresponding display brightness. For example, the display brightness corresponding to making first one time is 50%, the display brightness corresponding to making first twice is 60%, the display brightness corresponding to making first three times is 70%, and so on. The more of the times, the larger of the display brightness.

Further, in the embodiment of the present disclosure, the display brightness of the display unit may be further adjusted after the electronic device is switched into the second work state and the display unit displays the corresponding application picture with the first display brightness.

Particularly, in a first way, a second operation times corresponding to a second operation in a preset time is determined by the second sensing unit, when it is detected that a second part of an operating body is performing the second operation. A first adjustment brightness value corresponding to the second operation times is determined according to a relationship between an operation times and a display brightness. The display brightness of the display unit is controlled to be adjusted from a first display brightness to a second display brightness in response to the second operation, wherein a brightness value corresponding to the second display brightness is a sum value of the brightness value of the first display brightness and the first adjustment brightness value.

The adjustment brightness value may be an adjustment value which is set up corresponding to the operation times, for example, 10%, 15%, 20% and so on, i.e., the brightness proportion to be increased or decreased on the basis of the original brightness.

For example, when it is detected by the second sensing unit that the making first operation is performed by the second part of the user, the operation times in the preset time period is recorded. For example, the preset time period is 3 s. If the user making first twice, it may be determined that the second operation times is two. Then, according to the relationship between the operation times and the display brightness, it is determined that the corresponding first adjustment brightness value is 15%. If the first display brightness is 50%, the adjusted second display brightness is 65%.

In a second way, a third sensing parameter corresponding to a second operation is acquired, when the second operation performed by a second part of an operating body is an operation including a preset action. A first operation magnitude corresponding to the second part of the operating body is determined according to the third sensing parameter. A second adjustment brightness value corresponding to the first operation magnitude is determined according to a relationship between an operation magnitude and a display brightness. The display brightness of the display unit is controlled to be adjusted from a first display brightness to a third display brightness in response to the second operation, wherein a brightness value corresponding to the third display brightness is a sum value of the brightness value of the first display brightness and the second adjustment brightness value.

The first operation magnitude corresponding to the second part of the operating body may be a bending magnitude of a preset holding operation by a user's finger. For example, when the finger is straight, the corresponding operation magnitude may be 0. If the finger is in a state between the straightness and holding, the corresponding operation magnitude range may be (1,5]. If the finger is in a state between holding and making fist, the corresponding operation magnitude range may be (5,10]. The larger of the number, the larger of the bending magnitude of the finger. For example, when the operation magnitude is 10, it indicates the state of making fist. Thus, the corresponding second display brightness adjustment value may be determined by detecting the first operation magnitude corresponding to the second part, and the display brightness of the display unit may be adjusted to the third display brightness.

At this time, if the first operation magnitude determined by the third sensing parameter is 3, accordingly, the second display brightness adjustment value may be 10%. Alternatively, if the first operation magnitude is 7, the second display brightness adjustment value may be 15%. The third display brightness may be obtained by summing the adjustment brightness value and the first display brightness.

In the embodiment of the present disclosure, the brightness value of the second display brightness and/or the third display brightness may be a brightness value lower than the first display brightness, or may be a brightness value higher than the first display brightness. For example, if the first display brightness of the display unit is dark immediately after switching to the second work state, the display brightness may be increased by making first multiple times or controlling the second part to be at a certain bending magnitude. Alternatively, when the display brightness of the display unit is high, it may enter the brightness value decreasing mode by a certain option, so that the display brightness may be decreased by making first multiple times or controlling the bending magnitude of the second part. Other adjustment ways are also possible, and will not be described here in detail.

In the embodiment of the present disclosure, since the first switching instruction can be generated and the electronic device can be controlled to switch to the corresponding work state only when at least two sensing parameters meet the corresponding preset conditions by judging the at least two sensing parameters. The generation of the switching instruction is strict so that the controlling of the first switching instruction is accurate. Meanwhile, the switch of the work state of the device can by controlled by the first switching instruction alone, it is very convenient and the switching way is flexible. The display brightness of the display unit may be adjusted in various ways, so that the adjustment way of the electronic device is enriched and the user experience is improved.

Second Embodiment

Figure 3:
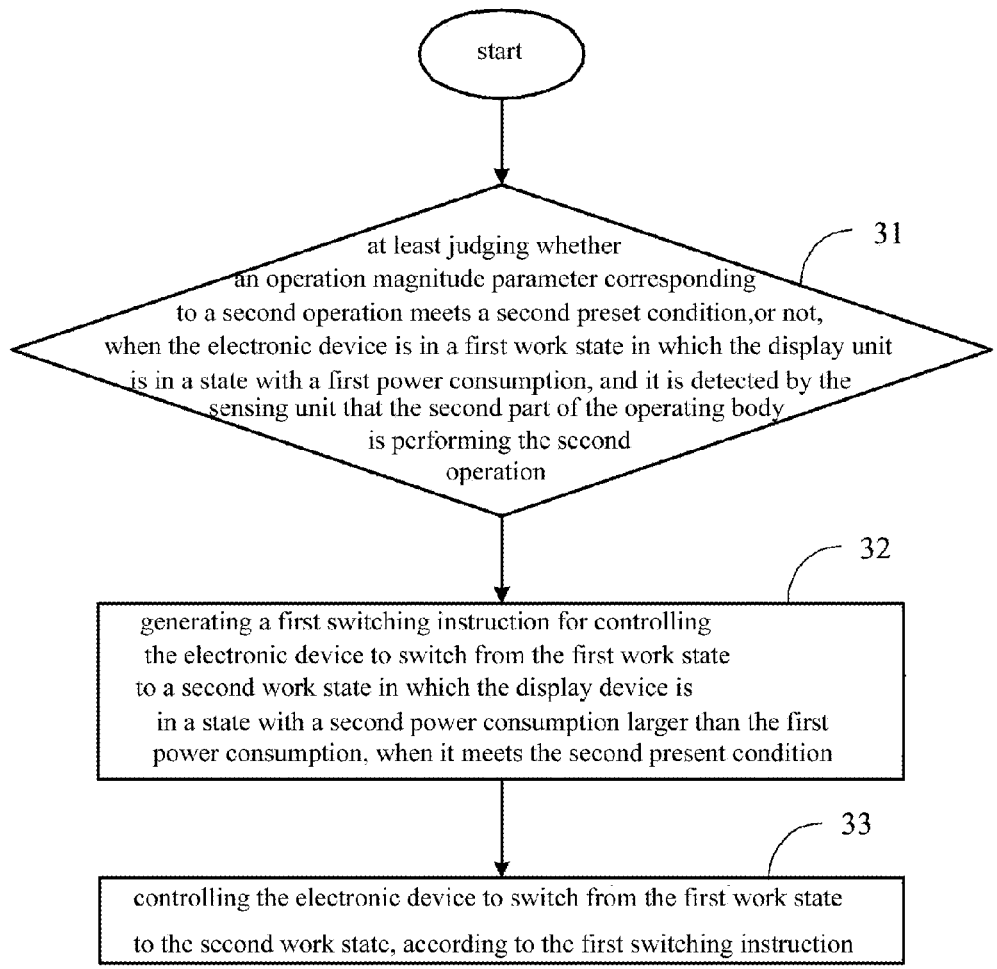
FIG. 3 is a main flowchart of a switching method in a second embodiment of the present disclosure.

Referring to FIG. 3, a switching method is provided in the embodiment of the present disclosure, which is applied to an electronic device comprising a display unit and a second sensing unit, the electronic device being fixed to a first part of an operating body through a fixing body. The method may comprise the following steps.

At a step 31, it is at least judged an operation magnitude parameter corresponding to a second operation meets a second preset condition, or not, when the electronic device is in a first work state in which the display unit is in a state with a first power consumption, and it is detected by the second sensing unit that the second part of the operating body is performing the second operation.

In the embodiment of the present disclosure, the display unit of the electronic device may be in a screen-off state in the first work state. That is, the electronic device may be in a standby state with a low power consumption.

Alternatively, in the embodiment of the present disclosure, the second sensing unit may be one or multiple sensors in the electronic device. When the electronic device is fixed to the first part of the operating body by a fixing body, the sensor may determine whether the second preset condition is met or not by acquiring the operation magnitude parameter of the second operation by the second part. The operating body may be the user's hand, the first part of the operating body may be part of the arm and the wrist wearing the watch, and the second part of the operating body may be the user's palm and the whole fingers. Generally, the electronic device may be fixed to the first part firmly by a fixing member such as a belt and may be maintained in a stable state with the operating body. The second operation may be a first making operation.

In particular, the biometric electrical signal generated during the muscle movement of the user's arm may be captured by the second sensing unit when determining the operation magnitude parameter of the second operation performed by the second part. For example, when the operation magnitude parameter is 5, it indicates that the second part is in a holding state, that is, the finger is in a half straight state. When the operation magnitude parameter is 10, it indicates that the second part is in a first making state.

When judging whether the operation magnitude parameter meets the second preset condition or not, it may be judged whether the operation magnitude is above a preset magnitude threshold which may be 5 in which the user's hand is in a holding state. If it is, the second operation performed by the second part is in a holding or first making state, and the second preset condition is met.

Alternatively, in the embodiment of the present disclosure, the electronic device further includes a first sensing unit. When capturing the operation magnitude parameter, it may further include: capturing a first sensing parameter of the electronic device by the first sensing unit, judging whether a first sensing parameter meets a first preset condition or not, wherein the first sensing parameter is capable of indicating a first operation corresponding to a first part of the operating body when the electronic device is fixed to the first part of the operating body.

The first sensing unit may be a sensor arranged in the electronic device, and may capture the biometric electrical parameter generated by the muscle of the user's arm as the first sensing parameter when the first operation is performed at the first part of the operating body, so as to judge whether the first sensing parameter meets the first preset condition or not.

For example, if the first operation is a swinging operation, the captured electrical signal parameter may be compared with the electrical signal parameter when the swinging operation is done at the user's arm. If the strength of the current swinging operation is larger than the preset swinging strength, it can indicate that the first sensing parameter meets the first preset condition, otherwise the first sensing parameter does not meet the first preset condition, so that the work state switch of the electronic device due to an incident action of the user is avoided and the power consumption is saved.

At a step 32, the electronic device can generate a first switching instruction for controlling the electronic device to switch from the first work state to a second work state in which the display unit is in a state with a second power consumption larger than the first power consumption, when it meets the preset condition.

The second work state may be a state in which the electronic device is in normal work and the display unit is in the screen-on state.

In the embodiment of the present disclosure, if the second sensing parameter is judged at the same time when the second operation is judged, the process of generating the first switching instruction by the electronic device may comprise: controlling the electronic device to generate the first switching instruction if the first sensing parameter meets the first preset condition and the operation magnitude parameter meets the second preset condition, so that the switching of the work state of the electronic device, and so on, may be controlled.

In the embodiment of the present disclosure, the first switching instruction is generated by two judgment processes. That is, the first sensing parameter corresponding to the first operation and the operation magnitude parameter corresponding to the second operation are detected and it is judged whether they meet the first preset condition and the second preset condition or not, respectively. The first switching instruction is generated only when they meet the corresponding conditions respectively. Therefore, the switching process is accurate based on the two judgment processes, and the error switching situation due to a single judgment process will not occur.

At a step 33, the electronic device is controlled to switch from the first work state to the second work state, according to the first switching instruction.

In the embodiment of the present disclosure, at the same time when the work state of the electronic device is switched, a specific application may be started and a corresponding display picture, for example, a clock application or a wallpaper application, may be displayed in the display unit, so that it is convenient for the user to check, operate, and so on.

Third Embodiment

Referring to FIG. 4, an electronic device is disclosed in an embodiment of the present disclosure, comprising: a display 1, at least two sensors 2 and a processor 3, wherein the at least two sensors 2 and the processor 3 may be located within the electronic device. Particularly, when the electronic device is in a second work state in which the electronic device is in the normal work, corresponding image information may be output by the display 1.

The at least two sensors 2 may be the gravity sensor, the infrared sensor or the capacitance sensor and so on, which is not limited in the present application. In the embodiment of the present disclosure, the at least two sensors may include a first sensor and a second sensor, wherein the first sensor may be used to capture a corresponding device parameter of the electronic device, which may indicate a first operation performed at a first part of an operating body corresponding to the electronic device, and the second sensor is used to capture a parameter corresponding to a second part of the operating body.

The operating body may be the user's hand or head. For example, when the electronic device is fixed at the user's hand, the first part of the operating body may be a part of the arm and the wrist wearing the watch, and the second part of the operating body may be the palm and all the fingers of the user. Generally, when the electronic device is at the first part, it has a relative location with respect to the first part.

In the embodiment of the present disclosure, when the electronic device is in the first work state, the first sensor of the at least two sensors 2 can sense a first sensing parameter, and the second sensor can sense a second sensing parameter. When the electronic device is in a first work state, the display 1 is in a state with the first power consumption. When the electronic device is in a second work state, the display 1 is in a state with a second power consumption larger than the first power consumption. The first work state may be a state in which the electronic device is in a standby state and/or the screen-off state.

Further, it may be judged whether the first sensing parameter meets a first preset condition and the second sensing parameter meets a second preset condition or not by the process of the processor 3. The processor 3 may comprise an operation logic section, a memory section and a control section and so on, which may be a CPU 3 of the electronic device. A first switching instruction can be generated when it is at least determined that the first sensing parameter meets a first preset condition and the second sensing parameter meets a second preset condition, and the electronic device is controlled to be switched from the first work state to the second work state based on the first switching instruction.

Alternatively, in the embodiment of the present disclosure, the electronic device may further comprise a main body and a fixing body. The main body may be a part where the display is located in FIG. 4, i.e., the main body of the electronic device. The main body part may be arranged with a battery, a chip, a memory card and so on, and may further comprise the at least two sensors 2 and/or the processor 3. Those skilled in the art may arrange it as necessary, which is not limited in the present disclosure.

The fixing body may be a fixing member for fixing the electronic device, such as the watch belt of the watch, or the head mounted support.

When the fixing body is in the fixed state, the fixing body can be at least a part of an annular space, or the fixing body is at least a part of an approximate annular space meeting a first predetermined condition; wherein the annular space or the approximate annular space can surround outside of the operating body meeting a second predetermined condition.

Particularly, for the fixing body, there are many implementations. Two of them are listed as follows, which are not limited thereto in the practical implementation.

In a first implementation, the fixing body at least has a fixing state, the fixing body can be at least a part of an annular space, or the fixing body is at least a part of an approximate annular space meeting a first predetermined condition; wherein the annular space or the approximate annular space can surround outside of the operating body meeting a second predetermined condition.

Particularly, when the fixing body comprises only a part, the fixing body can form the annular space with the main body where the display 1 is located, as shown in FIG. 5A, in which the numeral 50 represents the fixing body.

Referring to FIG. 5B, when the fixing body comprises a first fixing part represented by the numeral 51 and a second part represented by the numeral 52, a first end of the first fixing part is connected at a first side of the display 1, a third end of the second fixing part is connected at a second side of the display 1, and the first side and the second side are two sides of the display 1 opposite to each other.

At this time, if the material of the fixing body is a rigid material and a second end of the first fixing part and a fourth end of the second fixing part are in a disconnected state, the fixing body is in the fixing state. The first fixing part and the second fixing part are two parts of the approximate annular space. The approximate annular space meets a first predetermined condition. That is, the caliber between the second end of the first fixing part and the fourth end of the second fixing part is smaller than the caliber of the part where the wearable electronic device is located, such as the wrist, which is viewed as a cylinder operating body meeting a second predetermined condition, i.e., the caliber larger than that of the annular space. For example, if the perimeter of the wrist is 10 cm and the inner caliber of the annular space is 12 cm, the perimeter of the part connecting the wrist and the palm of the wearer should be at least larger than 12 cm so as to prevent the electronic device from being slipped off.

In a second implementation, the fixing body has at least the fixing state, the fixing body can be at least a part of an annular space, or the fixing body is at least a part of an approximate annular space meeting a first predetermined condition; wherein the annular space or the approximate annular space can surround outside of an approximate spherical object meeting a third predetermined condition.

The same part between the second implementation and the first implementation will not be described here to avoid redundancy. The different part between the second implementation and the first implementation lies in that, when the electronic device is worn at a certain part, for example, the head of the user, the head may be viewed as an approximate spherical object meeting the third predetermined condition, and the caliber of the approximate spherical object is larger than that of the annular or approximate annular space.

In the practical implementation, the fixing body needs to maintain a relative location between the electronic device and a first part of an operating body. Generally, the attribute parameter of the fixing body should be matched with the body parameter of the user. For example, if the electronic device needs to be fixed to the wrist of the user, the effective perimeter around the wrist when the fixing body maintains the relative location relationship should be larger than or equal to the outer perimeter of the wrist. For example, generally the perimeter of the wrist is between 10-15 cm, the effective perimeter of the fixing body should be at least 15 cm. Alternatively, if the electronic device needs to be fixed to the user's head, and the perimeter of the forehead of an adult is between 54-58 cm, the perimeter of the fixing body 2 may be 59 cm, and so on. Those skilled in the art may arrange it as necessary, which is not limited herein.

Therefore, in the embodiment of the present disclosure, based on the above structure, the main judgment function of the processor 3 comprises at least the following functions.

Firstly, it is used to judge whether a parameter value corresponding to the first sensing parameter is larger than a preset threshold which is a change value corresponding to a change in a spatial location occurred in the electronic device, or not; wherein, if it is, it indicates that the first sensing parameter meets the first preset condition. For example, when it is determined by the processor 3 that the detected spatial location change is above the preset threshold, it indicates that the user may perform an operation with a substantial movement on the electronic device, for example, the swinging or the shaking operation.

Secondly, it is used to judge whether the second sensing parameter matches with a preset parameter which is an operation parameter of a second part of the operating body performing an operation including a preset action when the electronic device is fixed to a first part of the operating body through the fixing body, or not; if it does, it is determined that the second sensing parameter meets the second preset condition. For example, the user performs a certain operation by his finger, the finger's bending magnitude may be determined by the detected electrical signal, and it may be further judged whether the finger is in a holding state or not. Referring to FIG. 6, the numeral 61 represents the first part of the operating body, the numeral 62 represents the second part of the operating body, the numeral 63 represents the annular space formed by the fixing body so as to fix the electronic device to the operating body, at this time, various parameters of the operating body may be detected.

Optionally, in the embodiment of the present disclosure, the fixing body may be arranged with the display 1, the sensor and the processor 3 and so on. The at least two sensors may be at the inner side of the annular space formed by the fixing body, referring to the annular structure of FIG. 5 again, to facilitate the acquisition of the sensing parameter related to the operating body.

For example, if the electronic device is fixed to the user's wrist by the fixing body, the parameter when the user's wrist performs a certain action may be acquired by the at least two sensors. Alternatively, if the electronic device is fixed to the user's head by the fixing body, the electrical signal change when the user nods or shakes may be also acquired, or even the user's brain electrical wave may be acquired.

Optionally, in the embodiment of the present disclosure, when the electronic device is fixed to the first part of the operating body by the fixing body, the biometric feature parameter of the first part which can indicate the second operation performed by the second part, may be captured by the second sensor. For example, when the electronic device is fixed at the user's wrist, if the user is making fist, the electrical signal change generated by the muscle due to the movement may be acquired at the wrist by the second sensor as the biometric feature parameter, so as to determine the second operation performed by the finger part, such as the first making operation.

Further, the processor 3 can adjust a display brightness of the display main body from a first display brightness to a second display brightness according to the parameters sensed by the at least two sensors 2. The detailed adjustment process may be referred to the steps in the first embodiment and will not be described here.

A switching method is provided in the embodiment of the present disclosure, which is applied to an electronic device comprising a display unit and at least two sensing units, the method comprising: capturing a first sensing parameter by a first sensing unit of the at least two sensing units, and capturing a second sensing parameter by a second sensing unit of the at least two sensing units, when the electronic device is in a first work state in which the display unit is in a state with a first power consumption; at least judging whether the first sensing parameter meets a first preset condition and the second sensing parameter meets a second preset condition, or not; the electronic device being capable of generating a first switching instruction for controlling the electronic device to switch from the first work state to a second work state in which the display unit is in a state with a second power consumption larger than the first power consumption, when a judging result indicates that the first sensing parameter meets the first preset condition and the second sensing parameter meets the second preset condition; and controlling the electronic device to switch from the first work state to the second work state, according to the first switching instruction.

In the embodiment of the present disclosure, when the electronic device is in a first work state with a low power consumption, since the first sensing parameter and the second sensing parameter can be acquired by the at least two sensing units, on the premise that the first sensing parameter meets a first preset condition and the second sensing parameter meets a second preset condition, the first switching instruction is generated so as to control the electronic device to switch from the first work state to a second work state with a large power consumption. Therefore, when it is detected that there are at least two sensing parameters meeting the preset conditions, the electronic device may be controlled to switch the work state by generating the first switching instruction. For example, the first sensing parameter and the second sensing parameter corresponding to the hand wearing the watch may be acquired by the at least two sensing units. If both meet the preset conditions, for example, if a predetermined operation by a hand or a finger is determined by the sensing parameter, for example if a swinging and a first making are performed at the same time, it may be determined that the first preset condition and the second preset condition are met, so that the work state switch may be performed without a specific button operation on the electronic device, thereby improving the flexibility of switching the work state of the electronic device.

Also, since it needs to determine whether the first sensing parameter meets a first preset condition and the second sensing parameter meets a second preset condition when generating the first switching instruction, or even more judgment processes, by the judgment of the multiple sensing parameters, the generation the first switching instruction by the electronic device is accurate, and the error response of the electronic device is avoided.

Particularly, the computer program instruction corresponding to the information processing method in the embodiment of the present disclosure may be stored on a storage media such as an optical disk, a hard disk, a USB disk and so on. When the computer program instruction corresponding to the switching method in the storage media is read or executed by an electronic device, the following steps are performed.

A first sensing parameter is captured by a first sensing unit of the at least two sensing units, and a second sensing parameter is captured by a second sensing unit of the at least two sensing units, when the electronic device is in a first work state in which the display unit is in a state with a first power consumption. It is at least judged whether the first sensing parameter meets a first preset condition and the second sensing parameter meets a second preset condition, or not. The electronic device is capable of generating a first switching instruction for controlling the electronic device to switch from the first work state to a second work state in which the display unit is in a state with a second power consumption larger than the first power consumption, when a judging result indicates that the first sensing parameter meets the first preset condition and the second sensing parameter meets the second preset condition. The electronic device is controlled to switch from the first work state to the second work state, according to the first switching instruction.

Optionally, the computer program instruction corresponding to the step of at least judging whether the first sensing parameter meets a first preset condition and the second sensing parameter meets a second preset condition or not, stored in the storage media, when performed by the computer, further causes the computer to perform the method comprising: judging whether a parameter value corresponding to the first sensing parameter is larger than a preset threshold which is a change value corresponding to a change in a spatial location occurred in the electronic device, or not; wherein, if it is, it indicates that the first sensing parameter meets the first preset condition; and judging the second sensing parameter matches with a preset parameter which is an operation parameter of a second part of an operating body performing an operation including a preset action when the electronic device is fixed to a first part of the operating body through a fixing body, or not; if it does, it is determined that the second sensing parameter meets the second preset condition.

Optionally, the computer program instruction corresponding to the step of at least judging whether the first sensing parameter meets a first preset condition and the second sensing parameter meets a second preset condition or not, stored in the storage media, when performed by the computer, further causes the computer to perform the method comprising: determining a first capturing timing corresponding to the first sensing parameter and a second capturing timing corresponding to the second sensing parameter; judging whether a time difference between the first capturing timing and the second capturing timing meets a third preset condition or not; the electronic device being capable of generating the first switching instruction for controlling the electronic device to switch from the first work state to the second work state when the judging result indicates that the first sensing parameter meets the first preset condition and the second sensing parameter meets the second preset condition comprising: controlling the electronic device to generate the first switching instruction if the judging result indicates that the first sensing parameter meets the first preset condition and the second sensing parameter meets the second preset condition, and the time difference meets the third preset condition.

Optionally, the computer program instruction corresponding to the step of judging whether a time difference between the first capturing timing and the second capturing timing meets a third preset condition or not and controlling the electronic device to generate the first switching instruction if it does, stored in the storage media, when performed by the computer, further causes the computer to perform the method comprising: determining the time difference between the first capturing timing and the second capturing timing; judging whether the time difference is in a preset time difference range, or not; determining that the time difference meets the third preset condition and controlling the electronic device to generate the first switching instruction, if it is.

Optionally, the computer program instruction corresponding to the step of controlling the electronic device to switch from the first work state to the second work state, according to the first switching instruction, stored in the storage media, when performed by the computer, further causes the computer to perform the method comprising: controlling the electronic device to switch from the first work state to the second work state and starting a specific application, according to the first switching instruction, wherein an application picture corresponding to the specific application can be displayed by the display unit.

Optionally, the computer program instruction corresponding to the step of at the same time when controlling the electronic device to switch from the first work state to the second work state according to the first switching instruction, stored in the storage media, when performed by the computer, further causes the computer to perform the method comprising: determining a first display brightness corresponding to the display unit according to the second sensing parameter; and controlling the display unit to display the corresponding application picture with the first display brightness.

Optionally, the computer program instruction corresponding to the step of determining the first display brightness corresponding to the display unit according to the second sensing parameter, stored in the storage media, when performed by the computer, further causes the computer to perform the method comprising: determining a first operation times of a second operation corresponding to the second sensing parameter performed by a second part of the operating body; and determining a display brightness corresponding to the first operation times as the first display brightness according to a relationship between an operation times and a display brightness.

The storage media further stores some other computer instructions which are executed after controlling the electronic device to switch from the first work state to the second work state according to the first switching instruction, and further causes the computer to perform the method comprising: determining a second operation times corresponding to a second operation in a preset time by the second sensing unit, when it is detected that a second part of an operating body is performing the second operation; determining a first adjustment brightness value corresponding to the second operation times according to a relationship between an operation times and a display brightness; and controlling the display brightness of the display unit to be adjusted from a first display brightness to a second display brightness in response to the second operation, wherein a brightness value corresponding to the second display brightness is a sum value of the brightness value of the first display brightness and the first adjustment brightness value.

The storage media further stores some other computer instructions which are executed after controlling the electronic device to switch from the first work state to the second work state according to the first switching instruction, and further causes the computer to perform the method comprising: acquiring a third sensing parameter corresponding to a second operation, when the second operation performed by a second part of an operating body is an operation including a preset action; determining a first operation magnitude corresponding to the second part of the operating body according to the third sensing parameter; determining a second adjustment brightness value corresponding to the first operation magnitude according to a relationship between an operation magnitude and a display brightness; and controlling the display brightness of the display unit to be adjusted from a first display brightness to a third display brightness in response to the second operation, wherein a brightness value corresponding to the third display brightness is a sum value of the brightness value of the first display brightness and the second adjustment brightness value.

Obviously, those skilled in the art may make various change and variations to the present disclosure without departing from the spirit and the scope of the present disclosure. It is intended to incorporate such change and variations into the present disclosure as long as the modifications and the variations of the present disclosure fall within the scope of the claims of the present disclosure and their equivalents.

The invention claimed is:

1. A switching method applied to an electronic device comprising a display unit and at least two sensing units, the method comprising:
capturing a first sensing parameter by a first sensing unit of the at least two sensing units, wherein the first sensing parameter is a device parameter corresponding to the electronic device that is captured by the first sensing unit and the device parameter indicates a first operation performed by a first part of an operating body corresponding to the electronic device;
capturing a second sensing parameter by a second sensing unit of the at least two sensing units, when the electronic device is in a first work state in which the display unit is in a state with a first power consumption, wherein the second sensing parameter is a parameter corresponding to a second part of the operating body, that is captured by the second sensing unit;
judging whether the first sensing parameter meets a first preset condition and the second sensing parameter meets a second preset condition, or not;
generating a first switching instruction for controlling the electronic device to switch from the first work state to a second work state in which the display unit is in a state with a second power consumption larger than the first power consumption, when a judging result indicates that the first sensing parameter meets the first preset condition and the second sensing parameter meets the second preset condition; and
controlling the electronic device to switch from the first work state to the second work state, according to the first switching instruction, wherein a second operation performed by the second part of the operating body is determined according to a biometric feature parameter of the first part captured by the second sensing unit, when the electronic device is fixed to the first part of the operating body through a fixing body.

2. The method of claim 1, wherein the step of judging whether the first sensing parameter meets a first preset condition and the second sensing parameter meets a second preset condition or not comprises:
judging whether a parameter value corresponding to the first sensing parameter is larger than a preset threshold that is a change value corresponding to a change in a spatial location occurred in the electronic device, or not; wherein, if it is, it indicates that the first sensing parameter meets the first preset condition; and
judging whether the second sensing parameter matches with a preset parameter that is an operation parameter of a second part of an operating body performing an operation including a preset action when the electronic device is fixed to a first part of the operating body through a fixing body, or not; if it does, it is determined that the second sensing parameter meets the second preset condition.

3. The method of claim 1, further comprising:
at the same time when judging whether the first sensing parameter meets a first preset condition and the second sensing parameter meets a second preset condition, or not, determining a first capturing timing corresponding to the first sensing parameter and a second capturing timing corresponding to the second sensing parameter;
judging whether a time difference between the first capturing timing and the second capturing timing meets a third preset condition or not;
generating the first switching instruction for controlling the electronic device to switch from the first work state to the second work state when the judging result indicates that the first sensing parameter meets the first preset condition and the second sensing parameter meets the second preset condition comprising:
controlling the electronic device to generate the first switching instruction if the judging result indicates that the first sensing parameter meets the first preset condition, the second sensing parameter meets the second preset condition, and the time difference meets the third preset condition.

4. The method of claim 3, wherein the step of judging whether the time difference between the first capturing timing and the second capturing timing meets the third preset condition or not and controlling the electronic device to generate the first switching instruction if it does, comprises:

determining the time difference between the first capturing timing and the second capturing timing;
judging whether the time difference is in a preset time difference range, or not;
determining that the time difference meets the third preset condition and controlling the electronic device to generate the first switching instruction, if it is in the preset time difference range.

5. The method of claim 4, wherein the step of controlling the electronic device to switch from the first work state to the second work state according to the first switching instruction comprises controlling the electronic device to switch from the first work state to the second work state and starting a specific application, according to the first switching instruction, wherein an application picture corresponding to the specific application is displayed by the display unit.

6. The method of claim 4, further comprising:
at the same time when controlling the electronic device to switch from the first work state to the second work state, according to the first switching instruction, determining a first display brightness corresponding to the display unit according to the second sensing parameter; and
controlling the display unit to display the corresponding application picture with the first display brightness.

7. The method of claim 6, wherein the step of determining the first display brightness corresponding to the display unit according to the second sensing parameter comprises:
determining a first operation times of a second operation corresponding to the second sensing parameter, the second operation being performed by a second part of the operating body; and
determining a display brightness corresponding to the first operation times as the first display brightness according to a relationship between an operation times and a display brightness.

8. The method of claim 6, further comprising:
after controlling the electronic device to switch from the first work state to the second work state according to the first switching instruction, determining a second operation times corresponding to a second operation in a preset time by the second sensing unit, when it is detected that a second part of an operating body is performing the second operation;
determining a first adjustment brightness value corresponding to the second operation times according to a relationship between an operation times and a display brightness; and
controlling the display brightness of the display unit to be adjusted from a first display brightness to a second display brightness in response to the second operation, wherein a brightness value corresponding to the second display brightness is a sum value of the brightness value of the first display brightness and the first adjustment brightness value.

9. The method of claim 6, further comprising:
after controlling the electronic device to switch from the first work state to the second work state according to the first switching instruction, acquiring a third sensing parameter corresponding to a second operation, when the second operation performed by a second part of an operating body is detected to be an operation including a preset action;
determining a first operation magnitude corresponding to the second part of the operating body according to the third sensing parameter;
determining a second adjustment brightness value corresponding to the first operation magnitude according to a relationship between an operation magnitude and a display brightness; and
controlling the display brightness of the display unit to be adjusted from a first display brightness to a third display brightness in response to the second operation, wherein a brightness value corresponding to the third display brightness is a sum value of the brightness value of the first display brightness and the second adjustment brightness value.

10. A switching method applied to an electronic device comprising a display unit, a first sensing unit, and a second sensing unit, the electronic device being fixed to a first part of an operating body through a fixing body, the method comprising:
judging whether an operation magnitude parameter corresponding to a second operation meets a second preset condition, or not, when the electronic device is in a first work state in which the display unit is in a state with a first power consumption, and it is detected by the second sensing unit that a second part of the operating body is performing the second operation, wherein the second sensing parameter is a parameter corresponding to a second part of the operating body, that is captured by the second sensing unit;
at the same time when at least judging whether an operation magnitude parameter corresponding to the second operation meets the second preset condition or not when the electronic device is in the first work state, capturing a first sensing parameter of the electronic device by the first sensing unit, judging whether the first sensing parameter meets a first preset condition or not, wherein the first sensing parameter is used for indicating a first operation corresponding to a first part of the operating body when the electronic device is fixed to the first part of the operating body and the first sensing parameter is a device parameter corresponding to the electronic device that is captured by the first sensing unit and the device parameter indicates a first operation performed by a first part of an operating body corresponding to the electronic device;
generating a first switching instruction for controlling the electronic device to switch from the first work state to a second work state in which the display unit is in a state with a second power consumption larger than the first power consumption, when it meets the second preset condition, wherein the step of generating the first switching instruction comprises controlling the electronic device to generate the first switching instruction if the first sensing parameter meets the first preset condition and the operation magnitude parameter meets the second preset condition; and
controlling the electronic device to switch from the first work state to the second work state, according to the first switching instruction, wherein a second operation performed by the second part of the operating body is determined according to a biometric feature parameter of the first part captured by the second sensing unit, when the electronic device is fixed to the first part of the operating body through a fixing body.

11. An electronic device, comprising:
a main body;
a fixing body for maintaining a relative location between the electronic device and a first part of an operating body when the electronic device is in a fixed state;

a display for outputting image information when the electronic device is in a second work state in which the display is in a state with a second power consumption larger than a first power consumption;

at least two sensors, a first sensor of which senses a first sensing parameter and captures a device parameter corresponding to the electronic device, which indicates a first operation performed by the first part of the operating body corresponding to the electronic device and a second sensor of which senses a second sensing parameter when the electronic device is in a first work state in which the display is in a state with the first power consumption, captures a parameter corresponding to a second part of the operating body, and captures a biometric feature parameter of the first part, when the electronic device is fixed to the first part of the operating body through a fixing body, the biometric feature parameter indicating a second operation performed by the second part; and a processor for generating a first switching instruction when it is at least determined that the first sensing parameter meets a first preset condition and the second sensing parameter meets a second preset condition, and controlling the electronic device to switch from the first work state to the second work state, wherein the display, the at least two sensors, and the processor are arranged within the main body and/or the fixing body.

12. The electronic device of claim 11, wherein in the fixed state, the fixing body is at least a part of an annular space, or the fixing body is at least a part of an approximate annular space meeting a first predetermined condition; wherein the annular space or the approximate annular space surrounds outside of the operating body meeting a second predetermined condition; and wherein, the at least two sensors are located at the inner side of the annular space.

13. The electronic device of claim 11, wherein the processor judges whether a parameter value corresponding to the first sensing parameter is larger than a preset threshold which is a change value corresponding to a change in a spatial location occurred in the electronic device, or not; and, if it is, it indicates that the first sensing parameter meets the first preset condition; and judges whether the second sensing parameter matches with a preset parameter which is an operation parameter of a second part of the operating body performing an operation including a preset action when the electronic device is fixed to the first part of the operating body through the fixing body, or not; if it does, it is determined that the second sensing parameter meets the second preset condition.

14. The electronic device of claim 11, wherein the processor adjusts a display brightness of the display from a first display brightness to a second display brightness according to the parameters sensed by the at least two sensors.

* * * * *